H. H. DEBOLT.
HEADLIGHT DIMMER.
APPLICATION FILED FEB. 26, 1921.
1,412,654.
Patented Apr. 11, 1922.
2 SHEETS—SHEET 1.
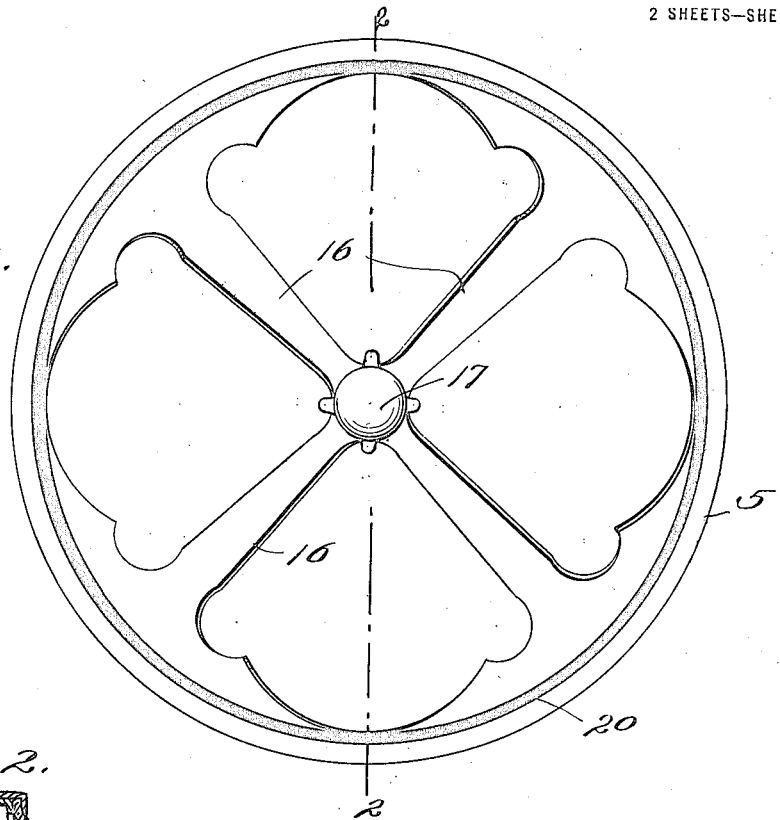
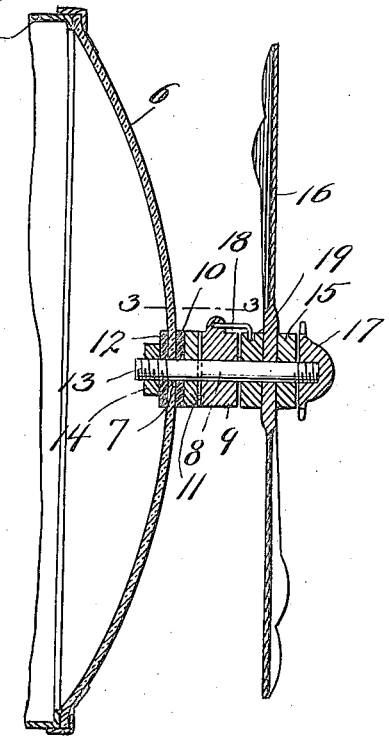
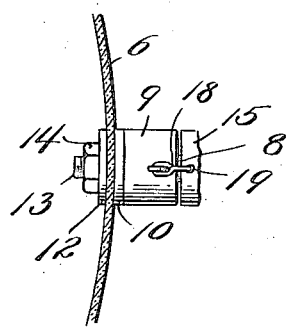
Inventor
Harry H. DeBolt
By *(signature)*
Attorney H. H. DEBOLT.
HEADLIGHT DIMMER.
APPLICATION FILED FEB. 26, 1921.
1,412,654.
Patented Apr. 11, 1922.
2 SHEETS—SHEET 2.
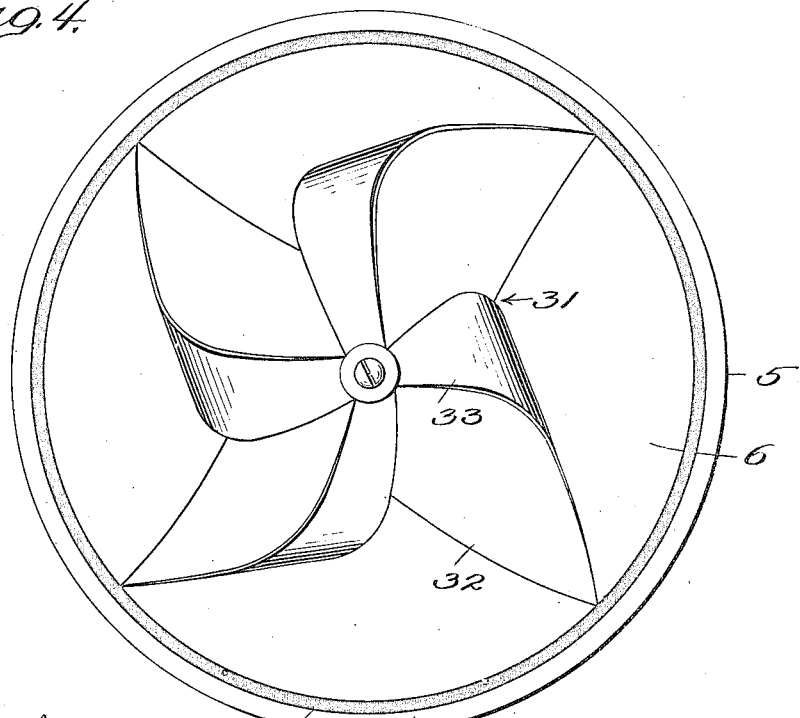
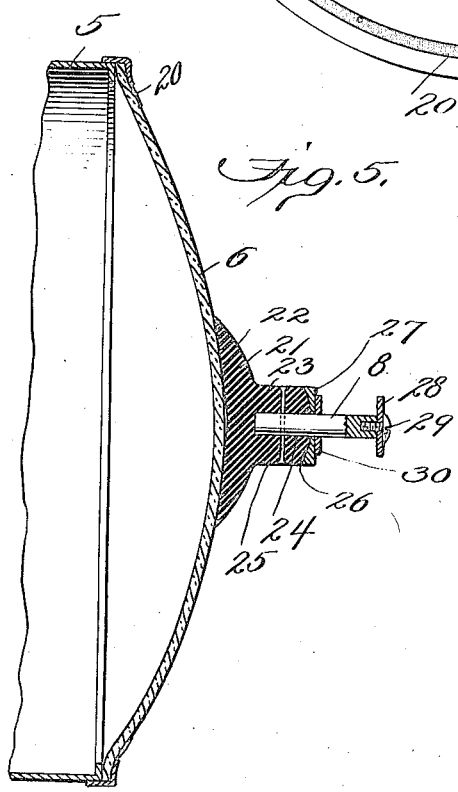
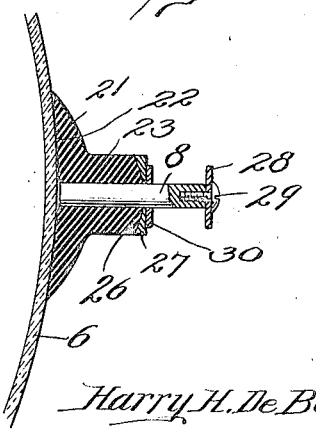
Inventor
Harry H. DeBolt
By
Attorney

UNITED STATES PATENT OFFICE.

HARRY H. DEBOLT, OF MORGANTOWN, WEST VIRGINIA.

HEADLIGHT DIMMER.

1,412,654.  Specification of Letters Patent.  Patented Apr. 11, 1922.

Application filed February 26, 1921. Serial No. 448,154.

*To all whom it may concern:*

Be it known that I, HARRY H. DEBOLT, a citizen of the United States, residing at Morgantown, in the county of Monongalia and State of West Virginia, have invented new and useful Improvements in Headlight Dimmers, of which the following is a specification.

This invention relates to a dimmer for the headlight of an automobile or like vehicle, and the primary object of the same is to provide means in advance of the headlight and as a part thereof for breaking up and softening the light rays to avoid blinding and disconcerting the driver of an approaching car, or a pedestrian attempting to cross in front of an automobile or car equipped with the improvement. A further object of the invention is to provide a dimming means in front of the headlight of an automobile or similar vehicle which is operated after the manner of a fan by the air pressure thereagainst during the movement of the automobile or car to set up a revolving light ray breaking up operation, and also to provide such a device which has an automatic rotation and modified as to speed of rotation in accordance with the fast or slow movement of the automobile or car. A still further object of the invention is to provide a dimmer for the headlight of an automobile or similar vehicle that does not require any attention, to render it operative, on the part of an automobile or car driver, nor the provision for and operation by any source of motive power in and from the automobile or car.

With these and other objects and advantages in view, the invention consists in the construction and arrangement of the several parts which will be more fully hereinafter described and claimed.

In the drawings:

Fig. 1 is a front elevation of a headlight showing the improved dimmer applied thereto.

Fig. 2 is a transverse vertical section on the line 2—2, Fig. 1.

Fig. 3 is a detail horizontal section of portions of a headlight and the improvement taken on the line 3—3 Fig. 2.

Fig. 4 is a front elevation of a modification of the improved dimmer.

Fig. 5 is a transverse vertical section of the dimmer shown by Fig. 4, the fan being removed.

Fig. 6 is a transverse vertical section of a portion of the improved dimmer showing a further modification.

The numeral 5 designates a headlight casing having a front glass 6, preferably of concavo-convex form. The improved dimmer is applied to the usual form of headlight and requires but a very minute modification in the structure of the latter to attach the improved dimmer thereto, the only variation or modification being the formation of an opening 7 in the center of the glass 6. Extending through and fixed relatively to the opening 7 of the glass 6 is a spindle or axle 8. Mounted on the spindle 8 is a frame block or bumper 9, and between the rear side of the latter and the center of the glass 6 around the opening 7 a rubber cushioning gasket 10 is mounted and also encircles the spindle, said gasket being held in close contact with the outer surface of the center of the glass 6. The frame block or bumper 9 is rigidly secured to the spindle 8 by a key pin or analogous device 11 inserted therethrough and through the said spindle. Against the center of the inner side of the glass 6 a second rubber gasket or washer 12 is mounted and encircles the spindle, and applied to the rear screw-threaded end 13 of the said spindle is a nut 14, whereby the spindle and frame block or bumper 9 are positively and firmly fixed to the front glass 6. It is obvious that the cushioning gaskets or washers 10 and 12 relieve the front glass of fracturing jar or vibration. The outer extremity of the spindle 8 has a hub 15 mounted thereon for free rotation, the said hub carrying a plurality of fan blades 16 which are preferably plated and highly polished on the side facing the glass 6. The hub 15 with its blades 16 is held in operative position on the outer extremity of the spindle 8 by a screw cap 17 or any other suitable device. At times it may be desired to hold the fan comprising the hub 15 and blades 16 against rotation when the use of this rotating device is undesirable, and to accomplish this result a latch hook 18 is movably attached to the upper portion of the frame block or bumper 9 and arranged to engage a socket 19 in the hub 15 in rear of the blades 16. To prevent the light rays from passing out through the front glass 6 adjacent to the engagement of the said glass with the headlight frame 5, it is preferred that the glass 6 at said point be sanded or rendered opaque, as at 20, such provision permitting the use of a fan having a less diametrical blade extent. In some instances, however, the blades 16 might be of such diametrical extent as to fully cover or rotate in front of the full extent of the front glass 6

In the form of a device shown by Figs. 4 and 5 the casing 5 and front glass 6 with the sanded or opaque peripheral band or rim 20 are the same as in the form of the improved device shown by Figs. 1, 2 and 3. In this modified structure the spindle or axle 8 does not extend through the front glass 6 and is provided with a mounting which will be equally efficient without requiring any mutilation of the said glass. The mounting, as shown by the modified construction in Figs. 4 and 5, consists of a rubber vacuum cup 21 which will be preferably formed with an extended depressed face 22 for application over the center of the outer side of the glass 6, suitable cement being used to effect a positive adherence of the mounting on the glass. Projecting outwardly from the center of the cup 21 is a block or boss 23 formed with a central bore 24 to receive the spindle, axle or shaft 8, which snugly fits the said bore and may be held against displacement by a pin 25 extending through the block or boss 23 and the shaft. The outer end 26 of the block or boss is of convex contour and has fitted thereover a suitable metal cap 27 to prevent wear directly on the block or boss 23, which is of rubber or the same material as the cup 21. The shaft 8 as in the form of the device first described has retention means provided at the outer end thereof consisting of a washer or cap 28 held applied by a screw 29 extending thereinto and into the outer end of the shaft. On the shaft 8 adjacent to the cap 27 a washer 30 may be applied as an additional wear take-up means and to retain the fan in place. Any number of the washers 30 may be used to occupy the space between the caps 27 and 28 to provide for a proper fitting and disposition of the fan on the projected portion of the spindle, axle or shaft 8 between the two caps. The further modified structure as shown by Fig. 6 is similar to the structure shown by Fig. 5, except that the shaft 8 extends entirely through the cup and block or boss 23; whereas, in Fig. 5 the said spindle, axle or shaft projects only part way through the mounting. In the modified structure shown by Fig. 6 the pin 25 is shown omitted, in view of the fact that the shaft 8 will be given sufficient support to retain the same in the cup and block or boss. The remaining features of the structure shown by Fig. 6 are precisely the same as those shown by Fig. 5 and have like reference characters applied thereto. The fan 31, as shown by Fig. 4, is also modified relatively to the fan shown by Figs. 1 and 2 and simulates an ordinary toy pin wheel, or is provided with blades 32 which have concave faces presented to the front and inner reduced members 33, which are bent inwardly and secured at the center or held loose on the part of the spindle, axle or shaft 8 between the caps 28 and 27. This modified form of fan is illustrated to indicate that it is proposed to use any type of fan that may be adapted for the purpose. The modified structures shown by Figs. 4, 5 and 6 are very much more simple than the structure first described and as shown by Figs. 1, 2 and 3, and as the fan 31 is very light, there will be little or no strain imposed on the spindle, axle or shaft 8. The spindle, axle or shaft 8 and the metal parts will all be formed from light metal, and the fan 31 may be constructed of any suitable material that will insure lightness and at the same time preserve reasonable durability in the fan structure.

The operation of the improved dimmer in either of its forms is very simple and is entirely automatic or self-controlled as to the speed of rotation of the fan in accordance with the speed of the automobile or car on the headlight to which the dimmer is applied. The latch 18, shown as a part of the first form of the improvement, having been disconnected from the hub 15 by releasing the latch from the socket 19, the movement of the automobile or car will cause the fan to rotate by the air pressure in contact with the blades 16, and the light rays will be softly diffused or broken up, or glare will be prevented, and the faster the automobile or car travels the stronger will be the light projected in front of the same, and when the automobile or car slows down the light will gradually decrease in glare, so that when the automobile or car is running slowly, the light rays will be very materially reduced in their projection and thus enable another automobile or car to more readily pass the one bearing the improved dimmer and also avoiding confusion to a pedestrian in passing in front of an automobile or car equipped with the improvement. The operation of the modified structures is the same, and the latch or other means to hold the fan against operation may be used with said latter structures if desired.

The improved dimmer may be readily applied to any car now in use at a comparatively small cost, and it will be understood that changes in the proportions, dimensions and minor details of the improved attachment may be made at will to adapt the same to various modifications.

What is claimed as new is:

1. A dimmer for a headlight having a front glass consisting of a spindle directly applied and held fixed solely by the center portion of the glass, the glass being provided with an opaque peripheral means to prevent projection of light rays therethrough, and a fan freely rotatable and automatically operable on the spindle in advance of and close to the glass to diffuse light rays projected through the glass in the area covered by the operation of the fan and also beyond the periphery of the fan.

2. A dimmer for a headlight having a front glass, consisting of a spindle directly connected to the center of the glass, a fan mounted to freely rotate on the spindle in advance of the glass, and means for holding the fan against rotation and permit free projection of light rays from the headlight.

3. A dimmer for a headlight having a front glass, consisting of a spindle directly secured to the center of the glass, a frame block secured on the spindle in advance of and close to the glass, a fan having a hub freely rotatable and automatically operable on the spindle in advance of the frame block and having a socket formed therein, and a latch movably carried by the frame block to engage the said socket.

4. The combination of a headlight having a frame with a front glass, the glass being rendered opaque adjacent to its attachment to the frame, and a dimmer attachment mounted for free rotation and automatic operation in advance of the glass and directly connected to the center of the latter the opaque portion of the front glass adjacent to the attachment of the frame preventing light rays from having free projection beyond the periphery of the dimmer.

In testimony whereof I have hereunto set my hand in presence of two subscribing witnesses.

HARRY H. DEBOLT.

Witnesses:
F. L. CONWAY,
E. W. HILL.